United States Patent
Nguyen et al.

(10) Patent No.: US 8,489,804 B1
(45) Date of Patent: Jul. 16, 2013

(54) SYSTEM FOR USING DYNAMIC RANDOM ACCESS MEMORY TO REDUCE THE EFFECT OF WRITE AMPLIFICATION IN FLASH MEMORY

(75) Inventors: Lau Nguyen, Sunnyvale, CA (US); Perry Neos, Los Altos, CA (US)

(73) Assignee: Marvell International Ltd., Hamilton (BM)

( * ) Notice: Subject to any disclaimer, the term of this patent is extended or adjusted under 35 U.S.C. 154(b) by 265 days.

(21) Appl. No.: 12/870,089

(22) Filed: Aug. 27, 2010

Related U.S. Application Data

(60) Provisional application No. 61/242,249, filed on Sep. 14, 2009.

(51) Int. Cl.
*G06F 12/00* (2006.01)
(52) U.S. Cl.
USPC ..................... 711/103; 365/185.33
(58) Field of Classification Search
USPC ..................... 711/103; 365/185.33
See application file for complete search history.

(56) References Cited

U.S. PATENT DOCUMENTS

| | | | |
|---|---|---|---|
| 2004/0168017 A1* | 8/2004 | Hayashi | 711/103 |
| 2008/0270680 A1* | 10/2008 | Chang | 711/103 |
| 2009/0228642 A1* | 9/2009 | Yano et al. | 711/103 |
| 2009/0327804 A1* | 12/2009 | Moshayedi | 714/8 |
| 2010/0106889 A1* | 4/2010 | Manning | 711/103 |
| 2010/0161885 A1* | 6/2010 | Kanno et al. | 711/103 |
| 2011/0055455 A1* | 3/2011 | Post et al. | 711/103 |
| 2012/0239853 A1* | 9/2012 | Moshayedi | 711/103 |

OTHER PUBLICATIONS

"Notification of Deleted Data Proposal for ATA8-ACS2"; Revision 0; Apr. 21, 2007; Frank Shu; Microsoft Corporation; 4 pages.

* cited by examiner

*Primary Examiner* — Hashem Farrokh

(57) ABSTRACT

A system includes a selection module, a control module, an erasing module, and a read/write module. The selection module is configured to select X of Y memory blocks (i) based on fullness of the X memory blocks and (ii) in response to a write command, where X and Y are integers greater than or equal to 1. The Y memory blocks are located in first memory. The control module is configured to store first data from the X memory blocks in second memory. The erasing module is configured to erase the first data from the X memory blocks. The read/write module is configured to write second data to the X memory blocks based on the write command.

16 Claims, 7 Drawing Sheets

| LBA | Physical Location |
|---|---|
| LBA 1 | Block 3, Page 20 |
| LBA 2 | No Data |
| ... | ... |
| LBA 10 | Block 3, Page 23 |
| LBA 11 | No Data |
| LBA 12 | Block 43, Page 10 |
| ... | ... |

LBA to Physical Location Map

FIG. 5A

| Physical Location | | Description |
|---|---|---|
| Block 1 | Page 1 | Invalid |
| | ... | ... |
| Block 2 | ... | ... |
| Block 3 | Page 20 | Valid |
| | Page 21 | Invalid |
| | Page 22 | Invalid |
| | Page 23 | Valid |
| | ... | ... |

Physical Location Description Table

FIG. 5B

SYSTEM FOR USING DYNAMIC RANDOM ACCESS MEMORY TO REDUCE THE EFFECT OF WRITE AMPLIFICATION IN FLASH MEMORY

CROSS-REFERENCE TO RELATED APPLICATIONS

This application claims the benefit of U.S. Provisional Application No. 61/242,249, filed on Sep. 14, 2009. The disclosure of the above application is incorporated herein by reference in its entirety.

FIELD

The present disclosure relates to memory systems and more particularly to solid-state drives.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Solid-state drives (SSD) use solid-state memory to store data. Examples of solid state memory include static random access memory (SRAM), dynamic random access memory (DRAM), and flash memory. SSDs are less susceptible to mechanical failures compared to conventional hard disk drives. This is because SSDs do not include as many moving parts as conventional hard disk drives. Further, SSDs have a faster startup time than conventional hard disk drives. This is because, unlike conventional hard disk drives, SSDs do not have to wait for a disk to spin up to a particular speed before data can be read from or written to the disk.

An SSD may include a plurality of NAND flash memory cells or DRAM memory cells. NAND flash memory may include single-level cell (SLC) flash or multi-level cell (MLC) flash. SLC flash stores a single bit of data per cell, and MLC flash stores store two or more bits of data per cell.

Flash memory has a finite number of erase-write cycles. A controller coordinates read, write, and erase cycles of the flash memory. For example, the controller loads firmware to calculate or translate a logical memory address provided by a host to a physical address within the flash memory.

SUMMARY

A system includes a selection module, a control module, an erasing module, and a read/write module. The selection module is configured to select X of Y memory blocks (i) based on fullness of the X memory blocks and (ii) in response to a write command, where X and Y are integers greater than or equal to 1. The Y memory blocks are located in first memory. The control module is configured to store first data from the X memory blocks in second memory. The erasing module is configured to erase the first data from the X memory blocks. The read/write module is configured to write second data to the X memory blocks based on the write command.

In another feature, the second memory comprises a dedicated portion having a size preselected to drive a write amplification for the first memory to one.

In another feature, the selection module selects the X memory blocks with less fullness than non-selected ones of the Y memory blocks.

In another feature, the first memory comprises non-volatile memory, and the second memory comprises volatile memory.

In still other features, a method includes selecting X of Y memory blocks (i) based on fullness of the X memory blocks and (ii) in response to a write command. The Y memory blocks are located in first memory. X and Y are integers greater than or equal to 1. The method further includes storing first data from the X memory blocks in second memory, erasing the first data from the X memory blocks, and writing second data to the X memory blocks based on the write command.

In another feature, the method further includes preselecting a size of a dedicated portion of the second memory to drive a write amplification for the first memory to one.

In another feature, the method further includes selecting the X memory blocks with less fullness than non-selected ones of the Y memory blocks.

In another feature, the first memory comprises non-volatile memory and the second memory comprises volatile memory.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

The present disclosure will become more fully understood from the detailed description and the accompanying drawings, wherein:

FIG. 5A illustrates a map of logical blocks and corresponding physical memory locations;

FIG. 5B illustrates a map of physical memory locations; and

DESCRIPTION

Figure 1:
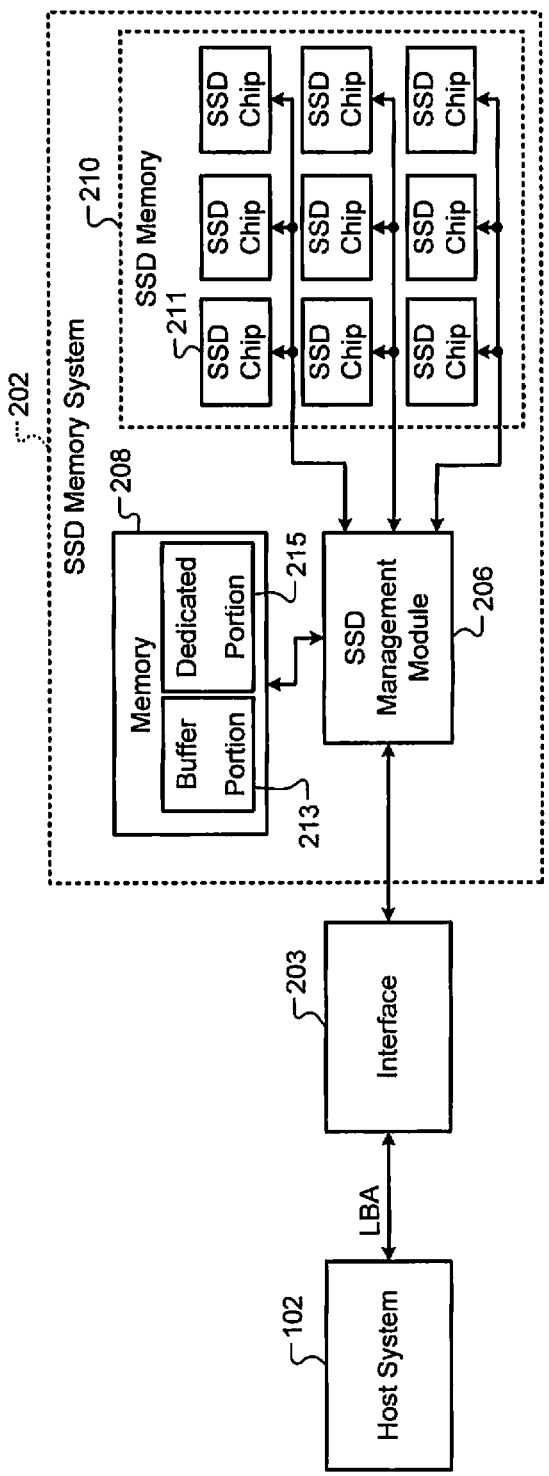
FIG. 1 is a functional block diagram of a memory system according to the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical OR. It should be understood that steps within a method may be executed in different order without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable components that provide the described functionality; or a combination of some or all of the above, such as in a systemon-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

A block of a solid-state drive (SSD) that is written once has to be erased in order to be re-written. The erase process is typically performed in blocks at a time. Accordingly, when a partially written block of the SSD is to be re-used for writing user data, any valid data stored in the block has to be collected before the block can be erased and used again for writing.

Collecting valid data from partially filled blocks of the SSD, merging the collected data, and re-writing the merged data to new blocks of the SSD causes "extra writes" to the SSD. In other words, to write X amount of user data to the SSD, an amount greater than X is typically written on the SSD. This is called write amplification. Typically, the number of write operations that can be performed on the SSD over the life of the SSD is finite. Write amplification reduces the number of write operations that remain available for writing new user data.

The present disclosure uses dynamic random access memory (DRAM) to alleviate effects of write amplification. Specifically, instead of re-writing the merged data to new blocks of the SSD, the collected data is written to the DRAM, thereby reducing effects of write amplification.

DRAM is used instead of simply increasing the capacity of the SSD for the following reasons. Unlike the SSD, DRAM can be overwritten without erasing first. That is, data can be overwritten on prewritten locations of the DRAM without first erasing the prewritten locations.

In contrast, the SSD writes only to "new" (i.e., erased) locations. When writing user data to a physical location in the SSD, the user data cannot be simply written over the physical location if the physical location presently stores data. Instead, the physical location is marked invalid, and the user data is written elsewhere in the SSD.

When enough number of invalid physical locations accumulate in a block, data from the remaining valid physical locations in the block is collected and re-written densely in a new block. Instead, when DRAM is used to write the collected data, the collected data is written directly onto the DRAM without first erasing the DRAM.

Referring now to FIG. 1, a host system 102 may communicate with a solid-state drive (SSD) memory system 202 via an interface 203. The host system 102 may include a computer, a multimedia device, a mobile computing device, etc. The interface 203 may include an advanced technology attachment (ATA) interface, a serial ATA (SATA) interface, etc. While the SSD memory system 202 is shown external to the host system 102 for illustration, the teachings of the present disclosure may also be implemented in SSD memory systems internal to the host system 102.

The SSD memory system 202 includes a SSD management module 206, memory 208, and SSD memory 210. The memory 208 may include volatile memory, such a dynamic random access memory (DRAM). The memory 208 has a longer write cycle life than the SSD memory 210. A longer write life cycle means that the memory 208 can be written to more number of times than the SSD memory 210 before wearing out.

The memory 208, which may correspond to a first or second level cache memory, includes a buffer portion 213 and a dedicated portion 215. The buffer portion 213 temporarily buffers data stored in the SSD memory 210. The dedicated portion 215 stores data from the SSD memory 210 to free up space in the SSD memory 210 during write operations to the SSD memory 210.

The host system 102 reads/writes data from/to the SSD memory 210 and the memory 208 via the SSD management module 206. The host system 102 communicates with the SSD management module 206 using a logical block addressing (LBA) scheme. An address specified in a LBA scheme may be referred to as "logical address." Accordingly, the host system 102 requests data from the SSD memory 210 at a logical address. For example, logical addresses may be denoted as LBA 1, LBA 2, etc.

The SSD memory 210 includes a plurality of SSD chips 211. The SSD memory 210 may include at least one of NAND flash memory and NOR flash memory. The SSD management module 206 reads/writes data from/to the SSD memory 210 and the memory 208. Additionally, the SSD management module 206 performs other operations on the SSD memory 210 and the memory 208. For example, the other operations include erasing and/or defragmenting.

The SSD management module 206 may store data from the SSD memory 210 in the dedicated portion 215 of the memory 208 when erasing the SSD memory 210 to avoid write amplification. The SSD management module 206 therefore manages the SSD memory 210 and the dedicated portion 215 as a single logical memory although the SSD memory 210 and the dedicated portion 215 are physically separate.

The SSD management module 206 buffers data in the buffer portion 213 of the memory 208. For example, the SSD management module 206 buffers data to be written to the SSD memory 210 in the memory 208. The SSD management module 206 may also buffer data read from the SSD memory 210 in the memory 208 to be subsequently transferred to the host system 102.

Figure 2:
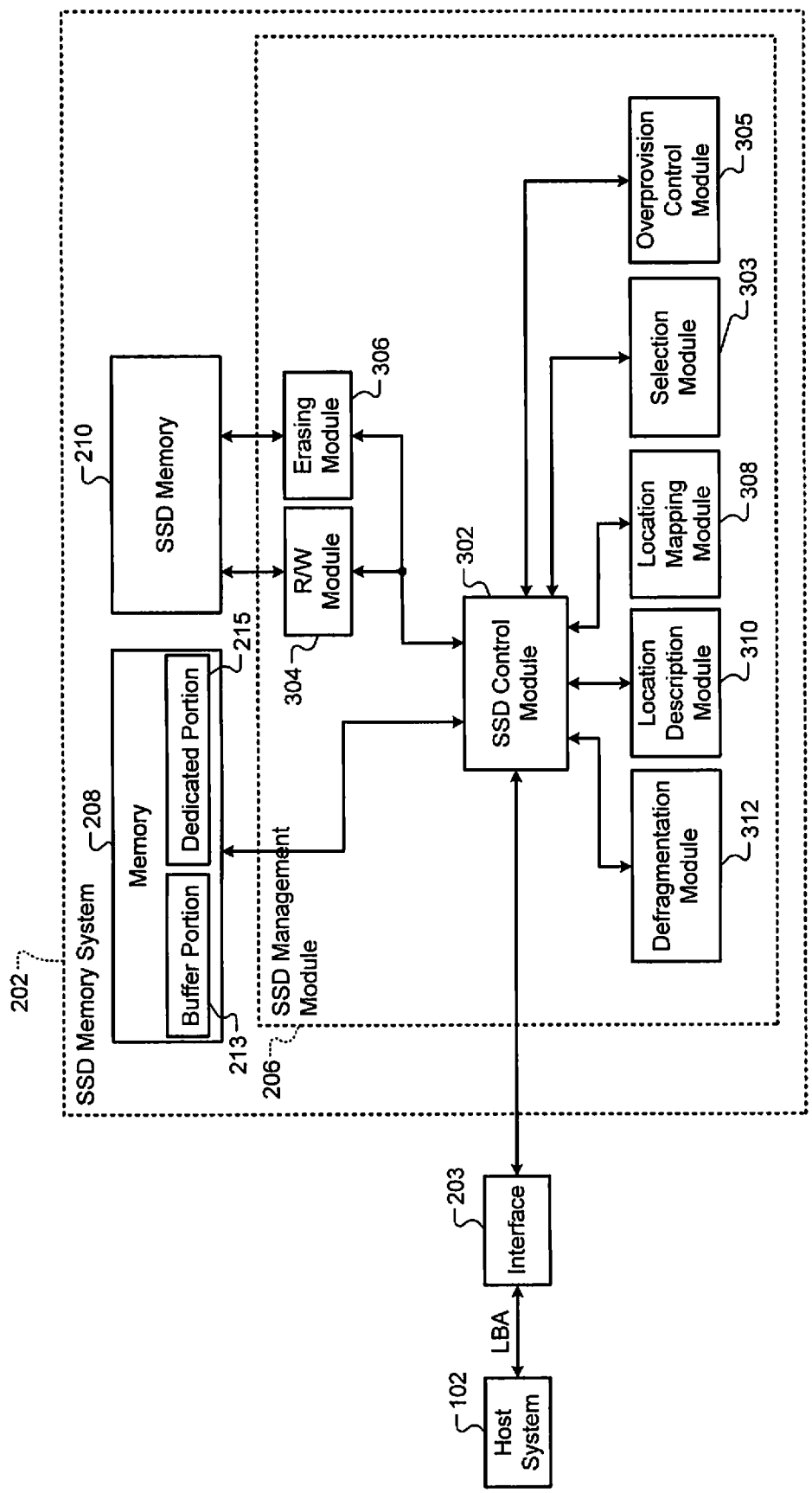
FIG. 2 is a functional block of the memory system of FIG. 1 showing details of a memory management module used in the memory system.

Referring now to FIG. 2, the SSD management module 206 includes a SSD control module 302, a selection module 303 and a read/write (R/W) module 304. The SSD management module 206 also includes an overprovision control module 305, an erasing module 306, a location mapping module 308, a location description module 310, and a defragmentation module 312.

The SSD control module 302 sends/receives data to/from the host system 102. The SSD control module 302 instructs the selection module 303 to select blocks of the SSD memory 210 based on capacity of the blocks. The selection module 303 may select blocks that are partially full for an erase and rewrite operation. For example, the selection module 303 may select the least full blocks for an erase and rewrite operation. The selection module 303 may select a number of the least full blocks at least until the selection module 303 determines that a sufficient amount of memory space in the SSD memory 210 will be freed up to receive data during a write command.

For example, the selection module 303 may select a number of blocks in the SSD memory 210 such that the empty capacity of the blocks at least equals the amount of data for a write operation. In typical SSD memory systems, data from the blocks would be erased and stored on some of the blocks leaving others of the blocks free to receive the write data. For example, to write one block of data to four blocks that are 25% full, a typical SSD memory system would write the data from the blocks to three of the blocks creating three full blocks and one empty block.

However, in the present disclosure, instead of re-writing the data from the blocks back to some of the blocks, the overprovision control module 305 causes the data to be written to the memory 208. Writing to the memory 208 (continuing the example of four blocks that are 25% full) frees up four blocks in the SSD memory 210. That is, four blocks of the SSD memory 210 are freed up although only one block of the SSD memory 210 is necessary for the write operation.

The overprovision control module 305 collects and stores data from the blocks selected by the selection module 303 into the dedicated portion 215 via the SSD control module 302. For example, the overprovision control module 305 collects and stores data from the least full blocks the SSD memory 210 into the dedicated portion 215 via the SSD control module 302.

The SSD control module 302 instructs the erasing module 306 to erase the least full blocks of the SSD memory 210. The erasing module 306 erases the least full blocks the SSD memory 210 after the data from the SSD memory 210 is stored in the dedicated portion 215. The SSD control module 302 instructs the location mapping module 308 to map a logical address to a physical location of data in the dedicated portion 215 of the memory 208.

The SSD control module 302 also instructs the R/W module 304 to read/write data from/to the SSD memory 210. The SSD control module 302 instructs the location mapping module 308 to map a logical address to a physical location of data in the SSD memory 210. The SSD control module 302 instructs the location description module 310 to map the validity of data in the SSD memory 210 and in the dedicated portion 215 of the memory 208. The SSD control module 302 performs a defragmentation operation on the SSD memory 210 via the defragmentation module 312.

Figure 3:
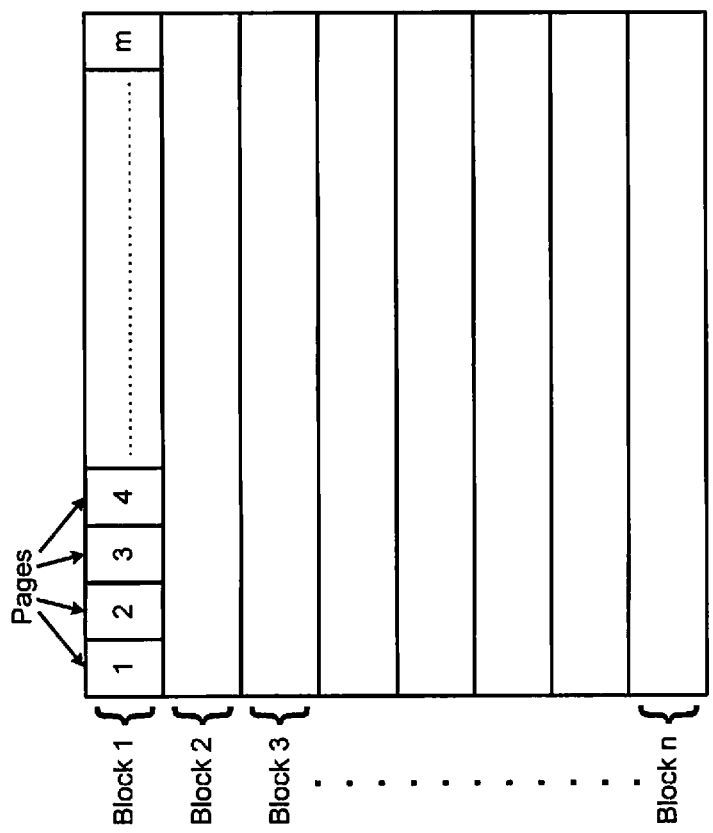
FIG. 3 is an illustration of a memory block and page arrangement according to the present disclosure.

Referring now to FIG. 3, an example of a block and page arrangement of the SSD memory 210 is shown. The SSD memory 210 includes n erase blocks, where n is an integer greater than or equal to 1. Each erase block includes m pages, where m is an integer greater than or equal to 1. For example only, an erase block may be 256 KB to 512 KB in size, and a page may be 4 KB in size. Accordingly, an erase block may include 64-128 pages. The erasing module 306 may erase data from the SSD memory 210 in units of blocks. For example, the erasing module 306 may erase one or more blocks when erasing data from the SSD memory 210.

The R/W module 304 reads/writes data from/to the SSD memory 210 in units of pages. Accordingly, the R/W module 304 reads/writes data from/to one or more pages when reading/writing data from/to the SSD memory 210. The R/W module 304 writes data to a page after the page is erased. The R/W module 304 may not write data to a page when the page includes previously written data until the erasing module 306 has erased the page.

As mentioned, the SSD memory 210 is erased in blocks in order to be re-written. However, this re-writing process may result in SSD write amplification. To illustrate, write amplification occurs when multiple writes are actually performed in response to a single write ordered by the host system 102. For example, some blocks of the SSD memory 210 may be partially written. In order for a partially written block of the SSD memory 210 to be re-used, any valid data stored in the block is collected before the block is erased and made usable again as explained above with reference to write amplification.

The amount of write amplification is typically a function of the ratio of user data capacity versus raw data capacity of the SSD memory 210. For example, if the SSD memory 210 has a raw data capacity of 32 G but a user capacity of 24 G, then in a steady state, 24 G of data are written throughout the 32 G space. Thus, there is 8 G of first level overprovision, and the average block of the 32 G is only 75% full (i.e., there is 25% first level overprovision). In reality, some blocks are more/less full than others, but the average is used for purposes of example.

When the blocks are 75% full (or 25% empty), four blocks are collected in order to free up one block of memory in response to a write command to write one block of memory. In other words, the number of blocks times the amount of memory space empty in each block equals the number of desired blocks (e.g., 4*0.25=1).

Therefore, to write one block of user data, four partially full blocks (e.g., 75% full blocks) are erased, freeing all four of the blocks for write operations and creating three full blocks. In other words, the number of partially full blocks times the amount of used space in the partially full blocks equals the number of full blocks (e.g., 4*0.75=3). The three full blocks are re-written thereby gaining one net free block for writing the user data.

The write amplification (WA) of this example is the total number of writes needed divided by the number of user data writes. Thus, for one block of user data (3+1)/1 yields a write amplification of four writes versus the one write requested by the host system 102. For a 25% overprovision, the resulting write amplification is better than four because not all blocks are 75% full.

In another example, where overprovision is 2 to 1, raw data may still be 32 G while user capacity may be 16 G. In this example, two partial blocks may be merged, and one full block may be written back before one block worth of user data can be written. Accordingly, the WA is two blocks written per one block of user data. In other words, WA=2/1=2. Thus, WA is a function of overprovision.

The present disclosure reduces write amplification to the SSD memory 210. Instead of rewriting data to the SSD memory 210 from SSD memory blocks, the present disclosure writes data to the dedicated portion 215 of memory 208. The SSD memory 210 inherently includes a first level of overprovision that is not counted in memory space available to the host system 102 (i.e., hidden from the user). The present disclosure provides the dedicated portion 215 as a second level of overprovision for the SSD memory 210.

Figure 4A:
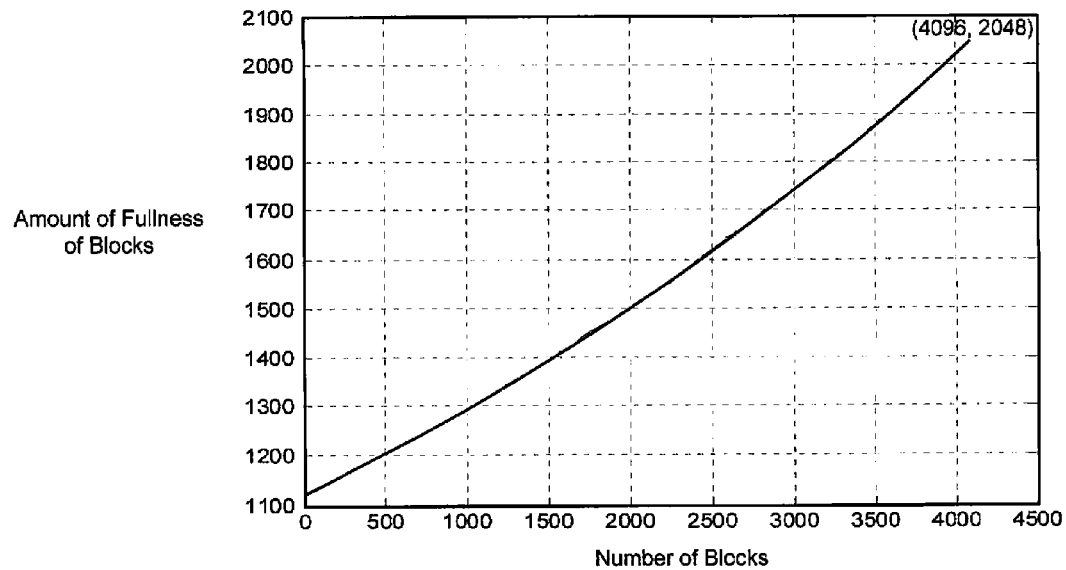
FIGS. 4A-4D are graphs that illustrate examples of features of memory blocks.

Referring now to FIGS. 4A-4D, in a practical SSD environment, for a particular amount of overprovision, not all blocks are uniformly full. For example, for a 25% overprovision (i.e., 75% user capacity), there is a distribution of block fullness that spans from 100% full to about 50% full. The distribution is close to a straight line, as seen in FIG. 4A. For example, 500 of the blocks are 1200/2048 full or ≈59% full. See the intersection of 1200 on the vertical axis and 500 on the horizontal axis in FIG. 4A, where vertical axis denotes fullness of blocks, where 2048=100% full, and horizontal axis denotes number of blocks.

Figure 4B:
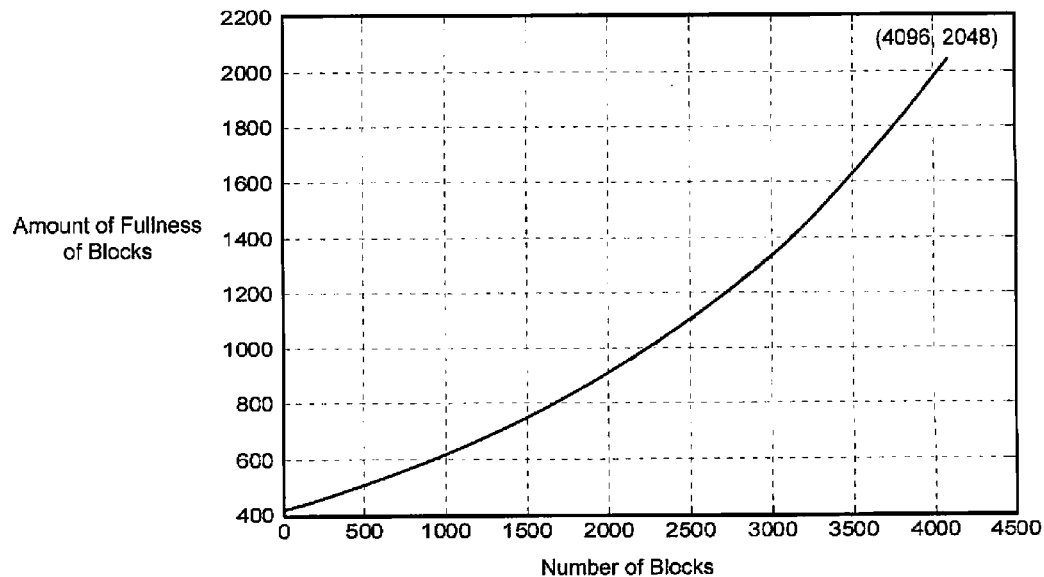

In an alternative example, if an overprovision greater than 25% is used, such as an overprovision of 50% (i.e., 50% user capacity), then the distribution of block fullness deviates significantly from a straight line. In other words, there are not as many blocks with almost zero fullness as those with almost 100% fullness. The distribution for the overprovision of 50% is shown in FIG. 4B. In this example, there are 500 blocks that are 416/2048 full or ≈20% full. See the intersection of approximately 416 on the vertical axis and 500 on the horizontal axis in FIG. 4B.

In practice, a memory block becomes more empty when a specific memory location that is written on that block gets re-written on a different block. Specific memory locations are re-written in response to commands from the host system 102. Rather than erasing a whole block, the location mapping module 308 simply remaps the logical location to a different physical location on a different block. Therefore, fuller blocks are more likely to have memory locations invalidated than less full blocks.

For example, a block that is almost 100% full versus a block that is only 10% full will be 10 times more likely to have memory locations invalidated. The term invalidated as used in this example means that a randomly chosen memory location resides in the fuller block 10 times as often as in the emptier one. So, a full block empties at a faster rate than an emptier one. As the block becomes more and more empty, it becomes increasingly more difficult to be invalidated further.

However, if the most empty block were down to 0% full, then the write amplification would be equal to 1. That is, data sent by the host system 102 would be written as is in the block. On the other hand, in FIG. 4B, the most empty blocks are still 20% full, which results in a write amplification for the SSD memory 210 of 5/4=1.25.

The present disclosure relates to freeing up the mostly empty blocks (i.e., least full blocks) by reading and then storing the valid data in the dedicated portion 215 of the memory 208. In the dedicated portion 215, the data can reside longer and thereby be more likely to be invalidated further while at the same time, the freed up blocks in the SSD memory 210 can be used to write new user data.

For example, for a 50% overprovision, the SSD control module 302 writes least full blocks, such as those that are 20% full, into the dedicated portion 215 as 100% full logical blocks of combined 20% full blocks. In other words, the data in the 20% full blocks is logically combined into 100% full blocks. For every one block worth of data that is stored in the dedicated portion 215, five 20% full blocks in the SSD memory 210 are freed up for re-writing.

Further, the 100% full blocks stored in the dedicated portion 215 are five times more likely to be invalidated than any of the 20% full blocks were. As more and more data is read and stored in the dedicated portion 215, the rate of adding data to the dedicated portion 215 (by collecting the most empty blocks) becomes equal to the rate at which memory locations inside the dedicated portion 215 become invalidated.

In other words, there is a size of the dedicated portion 215 (as a function of the user capacity) where the write amplification of the SSD memory 210 can be driven to one (i.e., write amplification would be eliminated). The size of the dedicated portion 215 may be preselected to drive the write amplification of the SSD memory 210 to one.

For example, an overprovision of 50% may be used, which results in the most empty blocks around 20% full, as shown in FIG. 4B. As the data in the most empty blocks is moved into the dedicated portion 215, the size of data stored in the dedicated portion 215 is increased by 20% of a full block. If the dedicated portion 215 is sufficiently large, then when a whole new block of user data is received, a whole block of data is invalidated. If the dedicated portion 215 is large enough so that 20% of the incoming data already resided in the dedicated portion 215, then those locations in the memory 208 would be freed up. This freeing up of memory may, on average, reduce the dedicated portion 215 fullness by the amount it was increased. This is illustrated in FIG. 4C.

Figure 4C:
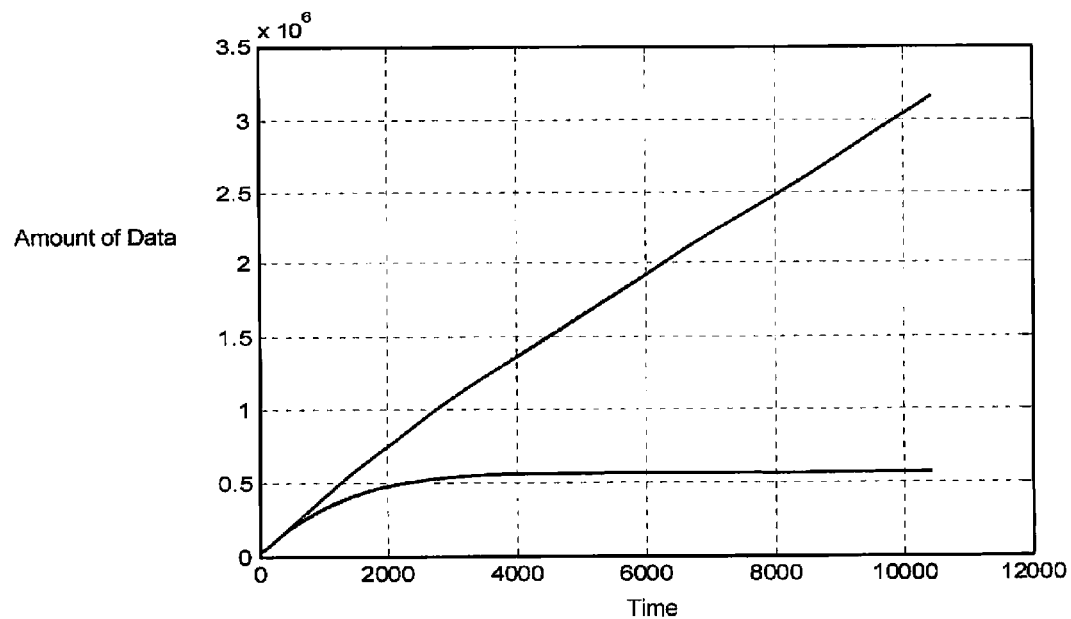

In FIG. 4C, despite more data being stored into the dedicated portion 215 (upper line), the average total data residing in dedicated portion 215 generally stays the same (lower line). This is because the dedicated portion 215 is preselected to drive the write amplification of the SSD memory 210 to one.

Figure 4D:
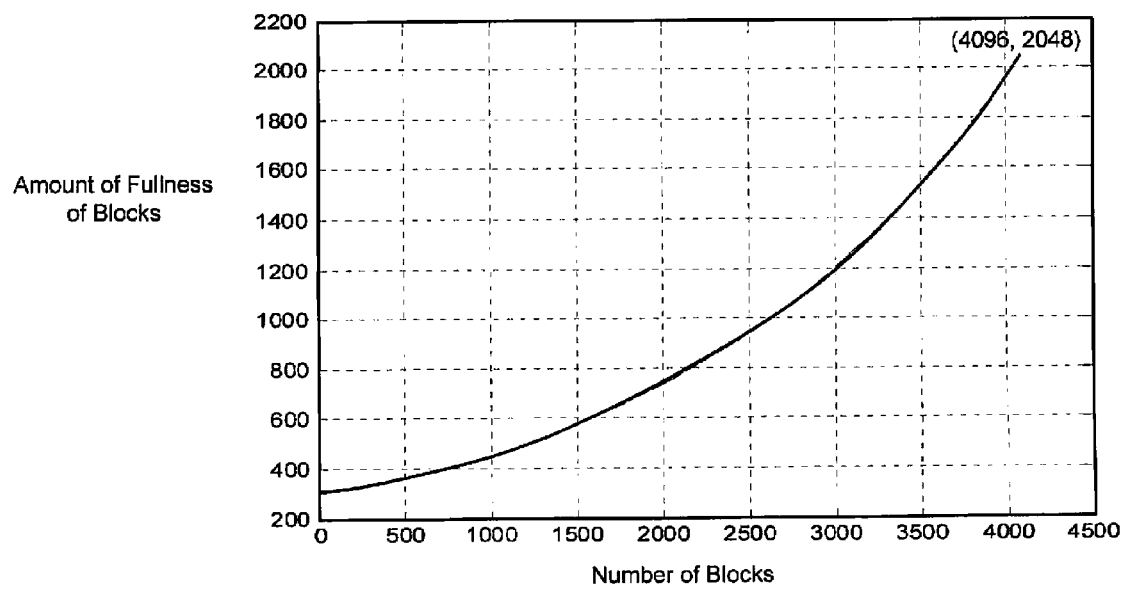

In FIG. 4D, a graph illustrates a memory distribution if second level overprovision used. Using the overprovision of 50% example, five partially full blocks (20% full blocks) would need to be collected into one block in the SSD memory 210. This collection process frees up four blocks in the SSD memory 210 to write new user data. The location description module 310 invalidates four blocks of data already residing in the SSD memory 210. By having the second level overprovision, as in the present disclosure, the collected data does not need to be written back to the SSD memory 210 using up one block in the SSD memory 210. Therefore, the SSD memory 210 can accept five blocks worth of user data. As a result, the most empty blocks become even less full, e.g., less than 20% full for 50% overprovision.

FIG. 4D illustrates second level overprovision, whereas FIG. 4B does not. The least full blocks with second level overprovision in FIG. 4D become 300/2048≈14% full as compared with 20% full in FIG. 4B without second level overprovision. In this example, there are 500 blocks that are 300/2048 full or ≈14% full. See the intersection of approximately 300 on the vertical axis and 500 on the horizontal axis in FIG. 4D.

Referring back to FIGS. 2-3, the location mapping module 308 includes an LBA to physical location map (hereinafter "location map"). The location map relates a logical address to a physical location in the SSD memory 210 and the dedicated portion 215 of the memory 208. For example, the location map relates a logical address to a block number and a page number of the SSD memory 210 or the dedicated portion 215.

The location mapping module 308 updates the location map when the R/W module 304 writes data to the SSD memory 210. The SSD control module 302 receives a command to write data to a logical address that was previously written. In other words, the SSD control module 302 may receive multiple commands to write to the same logical address. Since the R/W module 304 does not overwrite data at a physical location that has been written without first erasing the data already written, the R/W module 304 writes the data to a new physical location. The location mapping module 308 updates the location map to include the new physical location corresponding to the logical address.

To more specifically describe the process of writing data to the SSD memory 210, writing of new data to a logical address K may be performed as follows. The SSD control module 302 receives a command from the host system 102 to write data to LBA K. The SSD control module 302 instructs the R/W module 304 to write the data to a physical location X in the SSD memory 210. For example, X may be a next available physical location in the SSD memory 210. The R/W module 304 then writes to the physical location X. The location mapping module 308 then updates the location map to relate LBA K to physical location X. Accordingly, the SSD control module 302 reads, via the R/W module 304, from physical location X in the SSD memory 210 or the memory 208 (if the data has been removed to the memory 208) when the SSD control module 302 receives a request from the host system 102 to read from LBA K.

Referring now to FIG. 5A, an example of a location map is shown. The location map relates LBA 1 to a physical location of (block 3, page 20). The location map relates LBA 2 to "no data." For example, "no data" may indicate that the host system 102 has not written data to LBA 2 and/or LBA 2 does not include data.

The location description module 310 includes a physical location description table (hereinafter "description table"). The description table indicates a state of the data at a physical location. The state of the data may be a valid state or an invalid state. In other words, the description table indicates whether data written at a physical location of the SSD memory 210 is valid or invalid. Data may be indicated as valid/invalid in units of pages.

Data initially written to a page (i.e., after erasure) corresponding to a logical address may be indicated as valid in the description table. When new data is written to a new physical location that corresponds to the same logical address, the location description module 310 updates the description table to indicate that the new physical location is valid and the old physical location is invalid.

Updating the description table after consecutive writes to the same logical address may be performed as follows. The R/W module 304 writes data, corresponding to a logical address, to a physical location. The data at the physical location may be initially set to valid in the description table. Later, when the R/W module 304 writes new data corresponding to the same logical address at a new physical location, the data at the new physical location is set to valid in the description table. The data at the previous physical location is then set to invalid.

Referring now to FIG. 5B, an example of a description table is shown. The description table indicates that data at physical location (block 1, page 1) is invalid. In other words, the description table maps an invalid state to the physical location (block 1, page 1). The description table indicates that data at physical location (block 3, page 20) is valid. In other words, the description table maps a valid state to the physical location of (block 3, page 20).

Figure 6:
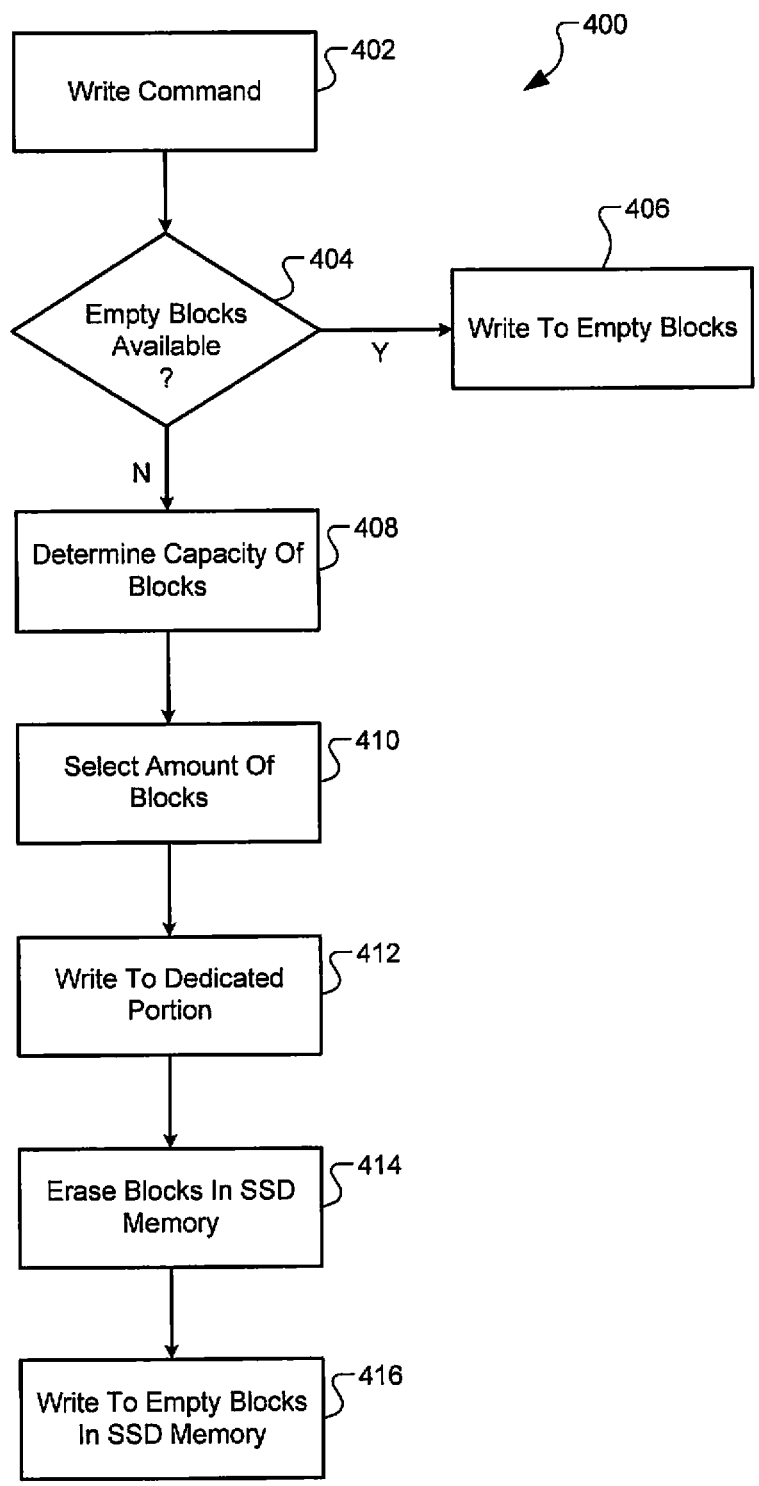
FIG. 6 is a flowchart of a method for operating a memory system according to the present disclosure.

Referring now to FIG. 6, a method 400 for operating the SSD memory system 202 according to the present disclosure is shown. At 402, the SSD control module 302 receives a write command to write data to memory blocks in the SSD memory 210. At 404, the SSD control module 302 determines, via the location mapping module 308 and the location description module 310, whether enough empty memory blocks are present to receive the data.

At 406, if enough empty memory blocks are available, the R/W module 304 writes to the empty blocks. If not, at 408, the selection module 303 determines a capacity of memory blocks in the SSD memory 210. In some implementations, the least full blocks may be selected so that full blocks may be formed from the data within the least full blocks. Full blocks will have data that becomes invalidated faster than not-full blocks.

At 410, the selection module 303 selects an amount of blocks. For example, the selection module 303 selects a number of least full blocks. In some implementations, the selection is made so that were the data in the selected blocks stored as full blocks in the SSD memory 210, a sufficient amount of empty blocks for the incoming data would be provided.

At 412, the overprovision control module 305 collects and stores data from the blocks selected by the selection module 303 into the dedicated portion 215 via the SSD control module 302. At 414, the erasing module 306 erases the selected blocks in the SSD memory 210. At 416, the R/W module 304 writes the incoming data to the newly erased blocks in the SSD memory 210. Following the write operation, there may be empty blocks in the SSD memory 210. The empty blocks result from selected blocks that had data collected from them to create full logical blocks of data in the dedicated portion 215.

In summary, write amplification can be reduced by adding overprovision using DRAM or Double Data Rate (DDR) memory (e.g., synchronous dynamic random access memory or DDR SDRAM). In some implementations, write amplification can be reduced to 1 (i.e., WA can be eliminated) by adding sufficient overprovision.

The present disclosure is not limited to using DRAM or DDR for the second level overprovision. Alternatively or additionally, other storage media, such as SLC NAND, phase change memory, and so on may be used. The wear would be concentrated in this over-provisioned area, instead of in the MLC NAND of the SSD memory system, which has a shorter life cycle. In this way, the SSD memory system can be manufactured with cheaper MLC NANDs, while the life of the SSD memory system is extended by using a small amount of more expensive but longer lasting SLC, DDR, phase change memory, etc.

Applicability of the teachings of the present disclosure is not limited to only the SSD device side. The teachings of the present disclosure can also be implemented on the host side (e.g., in modules comprising the BIOS, the OS, or higher level software applications).

The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:
1. A system comprising:
   a selection module configured to select a plurality of memory blocks of a flash memory in response to (i) the plurality of memory blocks being partially written with first data and (ii) receiving a write command to write second data to the plurality of memory blocks;
   a control module configured to, prior to erasing the first data from the plurality of memory blocks in order to write the second data in the plurality of memory blocks, (i) collect the first data from the plurality of memory blocks, (ii) merge the first data collected from the plurality of memory blocks, and (iii) write the merged first data in a portion of a dynamic random access memory instead of writing the merged first data in the flash memory;
   an erasing module configured to erase the first data from the plurality of memory blocks subsequent to collecting the first data from the plurality of memory blocks;
   a read/write module configured to write the second data to the plurality of memory blocks based on the write command subsequent to erasing the first data from the plurality of memory blocks; and
   a location description module configured to generate a description table indicating whether data in memory locations in the flash memory and the portion of the dynamic random access memory is valid or invalid, wherein data initially written to a first memory location corresponding to a logical address is indicated as valid, and in response to new data being written to a second memory location corresponding to the same logical address, the data in the first memory location is indicated as invalid, and wherein in response to the control module writing additional data to the portion of the dynamic random access memory, a rate of adding data to the portion corresponds to a rate at which data in memory locations in the portion becomes invalid.

2. The system of claim 1, wherein a size of the portion of the dynamic random access memory is preselected to drive a write amplification for the flash memory to one.

3. The system of claim 1, wherein the dynamic random access memory comprises a buffer to temporarily buffer data stored in the flash memory.

4. The system of claim 1, wherein prior to erasing the first data, memory space defining the plurality of memory blocks is at least equal to an amount of memory space required to store the second data.

5. The system of claim 1, wherein the selection module selects the plurality of memory blocks with less data than non-selected memory blocks of the flash memory.

6. The system of claim 1, wherein:
the flash memory comprises a first overprovision for the flash memory,
the dynamic random access memory comprises a second overprovision for the flash memory, and
capacities of the first overprovision and the second overprovision are hidden from a user.

7. The system of claim 1, further comprising a location mapping module configured to (i) map the flash memory and the portion of the dynamic random access memory as a single logical memory and (ii) map logical addresses to physical locations of data in the single logical memory.

8. The system of claim 1, wherein the location description module is configured to invalidate portions of the first data when the second data includes data corresponding to the portions of the first data.

9. A method comprising:
selecting a plurality of memory blocks of a flash memory in response to (i) the plurality of memory blocks being partially written with first data and (ii) receiving a write command to write second data to the plurality of memory blocks;
prior to erasing the first data from the plurality of memory blocks in order to write the second data in the plurality of memory blocks, (i) collecting first data from the plurality of memory blocks, (ii) merging the first data collected from the plurality of memory blocks, and (iii) writing the merged first data in a portion of a dynamic random access memory instead of writing the merged first data in the flash memory;

erasing the first data from the plurality of memory blocks subsequent to collecting the first data from the plurality of memory blocks;
writing the second data to the plurality of memory blocks based on the write command subsequent to erasing the first data from the plurality of memory blocks;
indicating data initially written to a first memory location corresponding to a logical address as valid;
in response to writing new data to a second memory location corresponding to the same logical address, indicating the data in the first memory location as invalid; and
generating a description table indicating whether data in memory locations in the flash memory and the portion of the dynamic random access memory is valid or invalid,
wherein in response to writing additional data to the portion of the dynamic random access memory, a rate of adding data to the portion corresponds to a rate at which data in memory locations in the portion becomes invalid.

10. The method of claim 9, further comprising preselecting a size of the portion of the dynamic random access memory to drive a write amplification for the flash memory to one.

11. The method of claim 9, wherein the dynamic random access memory comprises a buffer, the method further comprising:
temporarily buffering data stored in the flash memory in the buffer.

12. The method of claim 9, further comprising, prior to erasing the first data, selecting memory space defining the plurality of memory blocks to be at least equal to an amount of memory space required to store the second data.

13. The method of claim 9, further comprising selecting the plurality of memory blocks with less data than non-selected memory blocks of the flash memory.

14. The method of claim 9, wherein:
the flash memory comprises a first overprovision for the flash memory,
the dynamic random access memory comprises a second overprovision for the flash memory, and
capacities of the first overprovision and the second overprovision are hidden from a user.

15. The method of claim 9, further comprising:
mapping the flash memory and the portion of the dynamic random access memory as a single logical memory; and
mapping logical addresses to physical locations of data in the single logical memory.

16. The method of claim 15, further comprising invalidating portions of the first data when the second data includes data corresponding to the portions of the first data.

* * * * *

UNITED STATES PATENT AND TRADEMARK OFFICE
CERTIFICATE OF CORRECTION

PATENT NO. : 8,489,804 B1
APPLICATION NO. : 12/870089
DATED : July 16, 2013
INVENTOR(S) : Lau Nguyen and Perry Neos It is certified that error appears in the above-identified patent and that said Letters Patent is hereby corrected as shown below:

Title Page, item [54] and in the Specification, Col. 1, Line 1, change Title from "SYSTEM FOR USING DYNAMIC RANDOM ACCESS MEMORY TO REDUCE THE EFFECT OF WRITE AMPLIFICATION IN FLASH MEMORY" to "A SYSTEM FOR WRITING TO MEMORY"

Signed and Sealed this
Fifteenth Day of October, 2013

Teresa Stanek Rea
*Deputy Director of the United States Patent and Trademark Office*